US012637337B1

(12) United States Patent
Rotem et al.

(10) Patent No.: US 12,637,337 B1
(45) Date of Patent: May 26, 2026

(54) ELECTRIC JACK WITH DETACHABLE REMOTE CONTROL

(71) Applicant: Nebula Innovations LLC, Las Vegas, NV (US)

(72) Inventors: Nimrod Rotem, Sheung Wan (HK); Oleg Joukov, Shaar Efraim (IL); Efraim Rotem, Santa Clara, CA (US); Ariel Rotem, Hoboken, NJ (US)

(73) Assignee: Nebula Innovations LLC, Las Vegas, NV (US)

(*) Notice: Subject to any disclaimer, the term of this patent is extended or adjusted under 35 U.S.C. 154(b) by 0 days.

(21) Appl. No.: 19/309,300

(22) Filed: Aug. 25, 2025

(51) Int. Cl.
*B66F 3/44* (2006.01)
*B66F 13/00* (2006.01)
*B66F 15/00* (2006.01)

(52) U.S. Cl.
CPC ................ *B66F 3/44* (2013.01); *B66F 13/00* (2013.01); *B66F 15/00* (2013.01); *B66F 2700/04* (2013.01)

(58) Field of Classification Search
CPC .... B66F 13/00; B66F 3/08; B66F 3/20; B66F 3/44; B66F 7/14; B66F 7/28
See application file for complete search history.

(56) References Cited

U.S. PATENT DOCUMENTS

| | | | | |
|---|---|---|---|---|
| 7,472,889 B1 * | 1/2009 | Prather | B66F 3/44 | 254/98 |
| 11,584,624 B1 * | 2/2023 | Christensen | B66F 3/44 | |
| 2006/0081420 A1 * | 4/2006 | Ford | B66F 3/46 | 187/224 |
| 2013/0240300 A1 * | 9/2013 | Fagan | B66F 3/46 | 187/203 |
| 2019/0010033 A1 * | 1/2019 | England | B66F 3/44 | |
| 2021/0380379 A1 * | 12/2021 | Nooren | B66F 3/25 | |

* cited by examiner

*Primary Examiner* — Tyrone V Hall, Jr.
(74) *Attorney, Agent, or Firm* — Intellent Patents LLC; Ahmed Alhafidh

(57) ABSTRACT

A handheld electric jack includes a motorized screw drive mechanism housed within a cylindrical tool body, an actuating platform configured for linear motion, and a detachable control module operable in both docked and remote modes. The control module communicates wirelessly with the tool body and includes user interface elements for initiating lifting or lowering operations. The tool features safety interlocks, including dual-input activation, stall detection, and automatic shutoff. Load sensors and internal controllers enable responsive motor control based on sensor feedback. In some embodiments, multiple jacks wirelessly coordinate to perform synchronized lifting, monitor total load distribution, and respond to failure conditions. The modular platform accepts interchangeable lifting heads, and the system may be configured to operate autonomously or via user commands. This design improves safety, portability, and flexibility in construction, maintenance, and material handling applications.

15 Claims, 7 Drawing Sheets

ELECTRIC JACK WITH DETACHABLE REMOTE CONTROL

FIELD OF TECHNOLOGY

This disclosure relates generally to electrical lifting tools and, more particularly, to an electric jack with a detachable remote control unit.

BACKGROUND

Lifting, lowering, and clamping tools are indispensable in numerous industries for tasks such as positioning heavy components, supporting structures during assembly, and securing materials. Traditional tools for these purposes, such as manual jacks and clamps, typically require significant physical exertion from the user. This manual operation can lead to inefficiency, user fatigue, and an increased risk of accidents, such as those caused by sudden load shifts or tool slippage, particularly where precise and sustained force application is necessary.

The evolution towards powered solutions has been driven by the demand for greater efficiency, safety, and control. While various electric and hydraulic jacking tools exist, they often present their own limitations. Some powered tools lack the portability and ergonomic design suitable for one-handed operation in constrained spaces. Others may not offer sufficiently precise control over lifting, lowering, and clamping actions.

Furthermore, many existing powered tools require the operator to be in close proximity to the tool and the workpiece during operation. This can be problematic or hazardous in certain situations, such as when working in confined spaces with limited maneuverability, at heights, or where the workpiece itself presents a risk. Operating powered tools in these situations may involve additional insurance requirements and taking on certain projects may not be possible due to the potential for catastrophic losses.

Thus, there exists a need for an electric jack that combines ergonomic operation, portability, and remote functionality.

SUMMARY

The present disclosure provides an electric jack comprising a handheld, battery-powered tool body configured for lifting, lowering, and clamping operations. The electric jack includes an electric motor operatively coupled to a screw drive mechanism configured to convert motor rotation into linear displacement of an actuating platform. The actuating platform is modular and configured to be replaceable with differently-shaped or differently-sized heads and secured by a quick release mechanism, enhancing adaptability to different lifting and clamping tasks.

A rechargeable battery powers the electric motor and associated electronics within the tool body. The tool body includes a wireless communication interface configured to pair with a detachable control module. The control module is communicatively coupled to the electric motor through this wireless interface and is configured both to detachably couple to the tool body—serving as an ergonomic handle for direct operation—and to provide remote operation when decoupled.

User control of the actuating platform is facilitated through controls present on the tool body when the control module is attached, and through manually-operable controls on the control module when operating remotely. Safety features include a dual-input control mechanism requiring at least two distinct inputs for activation, a load detection mechanism utilizing strain gauge sensors to monitor applied forces and prevent operation beyond safe thresholds, and a stall detection mechanism that detects motor stalls and activates an emergency stop to protect the tool and workpiece.

The tool body is ergonomically balanced for one-handed operation with the control module attached. A manual override mechanism enables manual adjustment of the actuating platform in the event of power failure or system malfunction. In some embodiments, the manual override comprises a clutch release or a retractable hand crank to permit safe manual repositioning of the actuating platform.

The screw drive mechanism comprises a lead screw operatively engaged with an integrated guide structure within a cylindrical housing of the tool body, ensuring precise and stable conversion of rotational motion to linear actuation.

In advanced embodiments, the wireless communication interface allows pairing with multiple electric jacks, enabling synchronized operation. A weight distribution analysis module assesses loads from multiple units to maintain balanced and coordinated lifting.

This electric jack design offers enhanced safety, versatility, and ergonomic operation for construction, maintenance, and material handling applications where precise, remote-controlled lifting and clamping is advantageous.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, involve an electric jacking tool with a detachable remote control unit.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Definitions

"Jack" may refer to an electric lifting/lowering tool or the act of lifting/lowering. "Electric jack" or "electric jack tool" may be used interchangeably.

Elements described herein as coupled may have a direct or indirect connection with one or more other intervening elements.

Aspects of the present disclosure provide a handheld, battery-powered electric jack configured for use in lifting, lowering, or clamping operations in various environments, such as construction, mechanical installation, and maintenance applications. The jack includes a detachable control module which serves as a handle and allows control of tool operations when coupled to or decoupled from the tool body 110.

Figure 1:
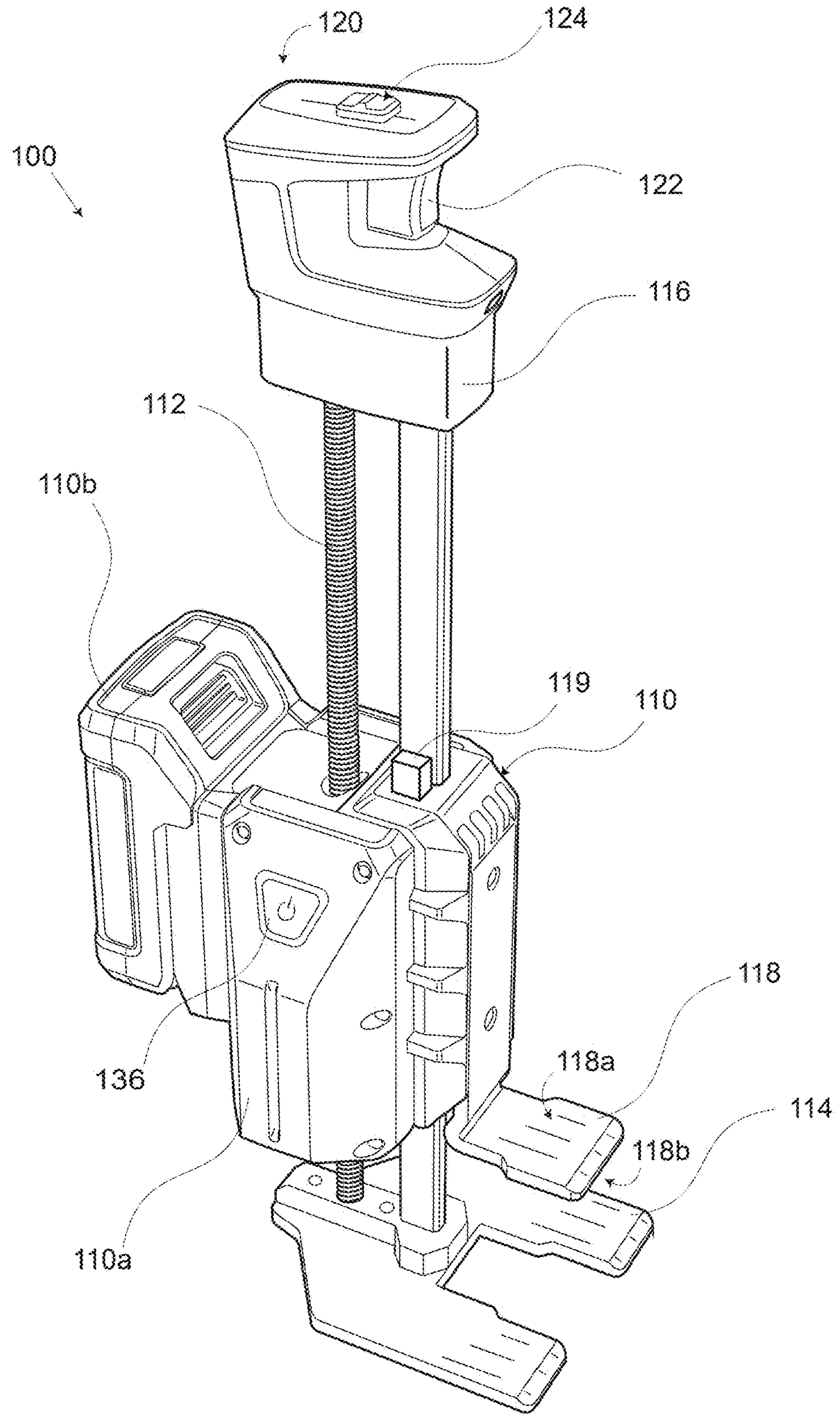
FIG. 1 is a perspective view of an exemplary electric jack, according to one or more embodiments.

Referring to FIG. 1 a perspective view of an exemplary electric jack 100 are shown, according to one or more embodiments. The electric jack 100 may comprise a tool body 110 and a control module 120. The tool body 110 may comprise a manifold 110*a* which is physically coupled to an enclosed screw drive mechanism 300 (shown in FIG. 3). An internal nut of the screw drive mechanism 300 may be concentrically aligned with an axis of a screw 112 fixed on one end to a base 114 and on another end to a control module base 116. Operation of the electric motor 310 within the screw drive mechanism 300 rotates the internal nut around the screw 112. The rotating nut is disposed within the screw drive mechanism such that its rotational motion is translated to linear motion of the manifold 110*a* along the axis of the screw 112.

The tool body 110 also comprises an actuating platform 118 detachably and adjustably coupled to a portion of the manifold 110*a* (e.g., through one or more fasteners). The actuating platform 118 may be used to lift an object away from the base 114 or push an object toward the base 114. By actuating the internal screw drive mechanism such that the manifold 110*a* translates along the screw 112 downward toward the base 114, the actuating platform 118 may exert a clamping force on an object placed between the actuating platform 118 and the base 114. Alternately, when in reverse motion, the manifold 110*a* may cause the actuating platform 118 to exert a lifting force on an object and pull it away from the base 114.

In one embodiment, the actuating platform 118 may simply involve a perpendicularly extending arm that comprises a first surface 118*a* and an oppositely facing second surface 118*b*. The second surface 118*b* may face the base 114 and may be in contact with an object clamped between the second surface 118*b* and the base 114. Alternately, the first surface 118*a* may contact an object being lifted away from the base 114. The actuating platform 118 is removable from the manifold 110*a* by, for example, removing all fastening screws. Or, a quick release mechanism 119 may be integrated into the tool body 110 which may be pressed to allow the actuating platform 118 to be removed without the use of tools.

In one or more embodiments, the electric jack 100 is handled and controlled at least by a control module 120 physically configured to detachably couple to the control module base 116. In one embodiment, the control module 120 housing and the control module base 116 may comprise interlocking portions along the control module 120 to be fixed to the control module base 116 or vice versa. Alternately, the control module 120 and the control module base 116 may be magnetically attachable. When so fixed to the control module base 116, the control module 120 serves as a physical handle for optimal placement and ergonomic use of the electric jack 100. In one embodiment, the control module 120 may comprise a trigger 122 which controls power to the motor of the screw drive mechanism. Alternately, the tool body 110 may comprise a user interface 136 which may comprise primarily a power button configured to enable or disable power to the electric motor 310, functioning similarly to the trigger 122 on the control module 120. However, the tool body user interface 136 does not include directional controls; directional inputs are provided exclusively through the control module 120. The control module 120 comprises a user interface 124 (e.g., directional controls such as UP and DOWN or arrows signifying the same) allowing the user to choose the direction of the manifold 110*a* and in so doing, manipulate the direction of forces applied by the actuating platform 118.

In one embodiment, the control module base 116 comprises one or more magnets embedded beneath its outer surface, arranged to generate a magnetic field suitable for securely attaching the control module 120. Correspondingly, the mating surface of the control module 120 includes ferromagnetic elements or complementary magnets configured to magnetically couple with the control module base 116. This magnetic attachment enables stable, yet readily detachable, physical coupling between the control module 120 and the control module base 116 without the need for mechanical fasteners or latches. The magnets may be arranged in a specific polarity pattern to ensure proper alignment and resist accidental disconnection due to shock or vibration. The contacting surfaces of the control module 120 and control module base 116 are designed to be flush or ergonomically contoured to provide a comfortable and secure grip when the control module 120 is attached, effectively serving as a handle for the electric jack tool 100.

Figure 2:
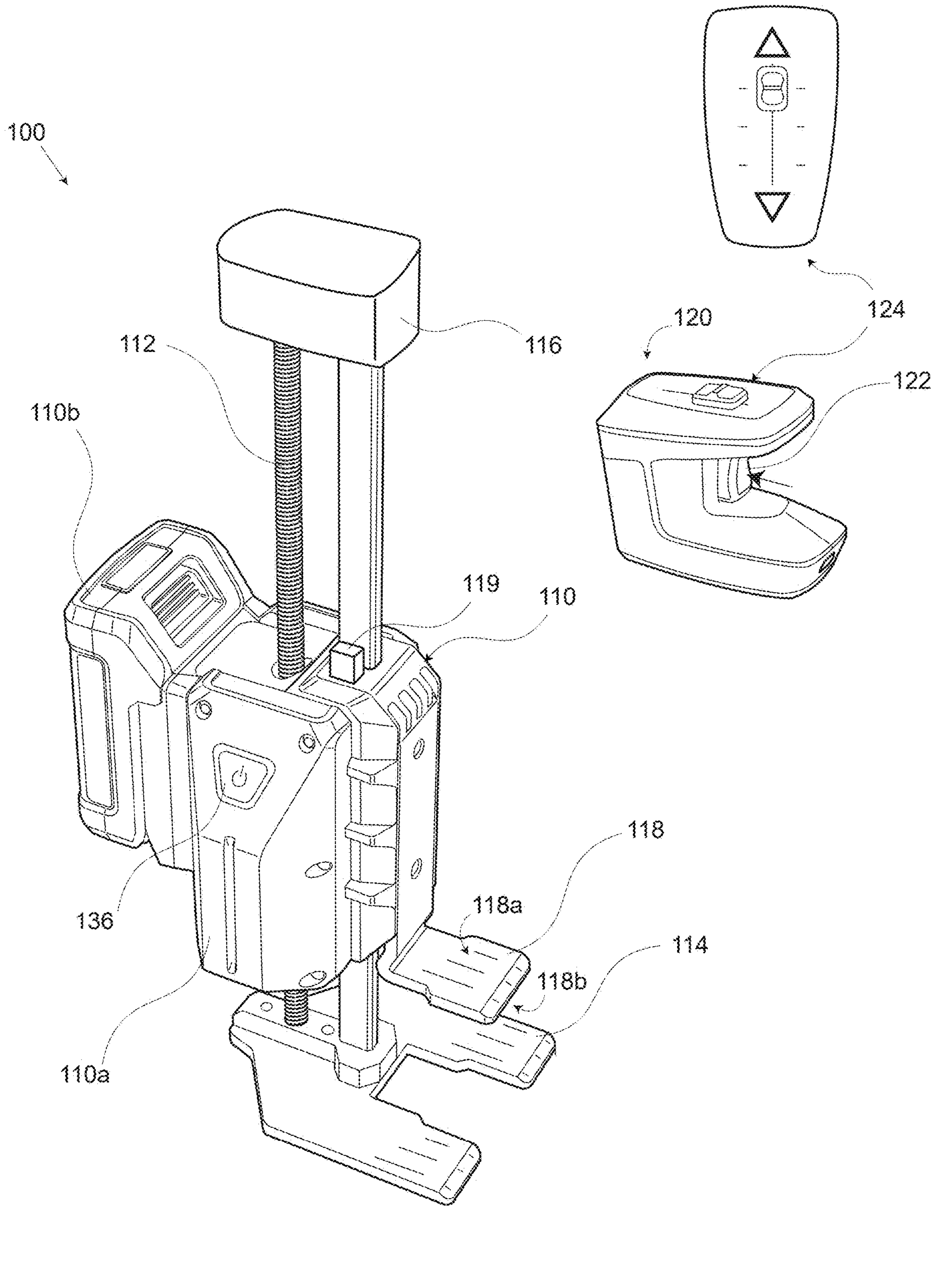
FIG. 2 is a perspective view of an exemplary electric jack showing different physical configurations, according to one or more embodiments.

The magnetic coupling further allows the control module 120 to be easily detached by pulling or sliding the module away from the control module base 116, as shown in FIG. 2, facilitating remote operation of the electric jack tool 100. The magnetic connection also supports electrical continuity for data or power transfer if contact pads or connectors are integrated adjacent to the magnets, though such features may be implemented in alternative embodiments.

As shown in FIG. 2, the control module 120 may pull or slide out and/or away from the control module base 116, allowing the control module 120 to be used to remotely control the operation of the electric jack 100. Internal electronic components of the tool body 110 and the control module 120 and their interactions are discussed in more detail in FIG. 4.

Figure 3:
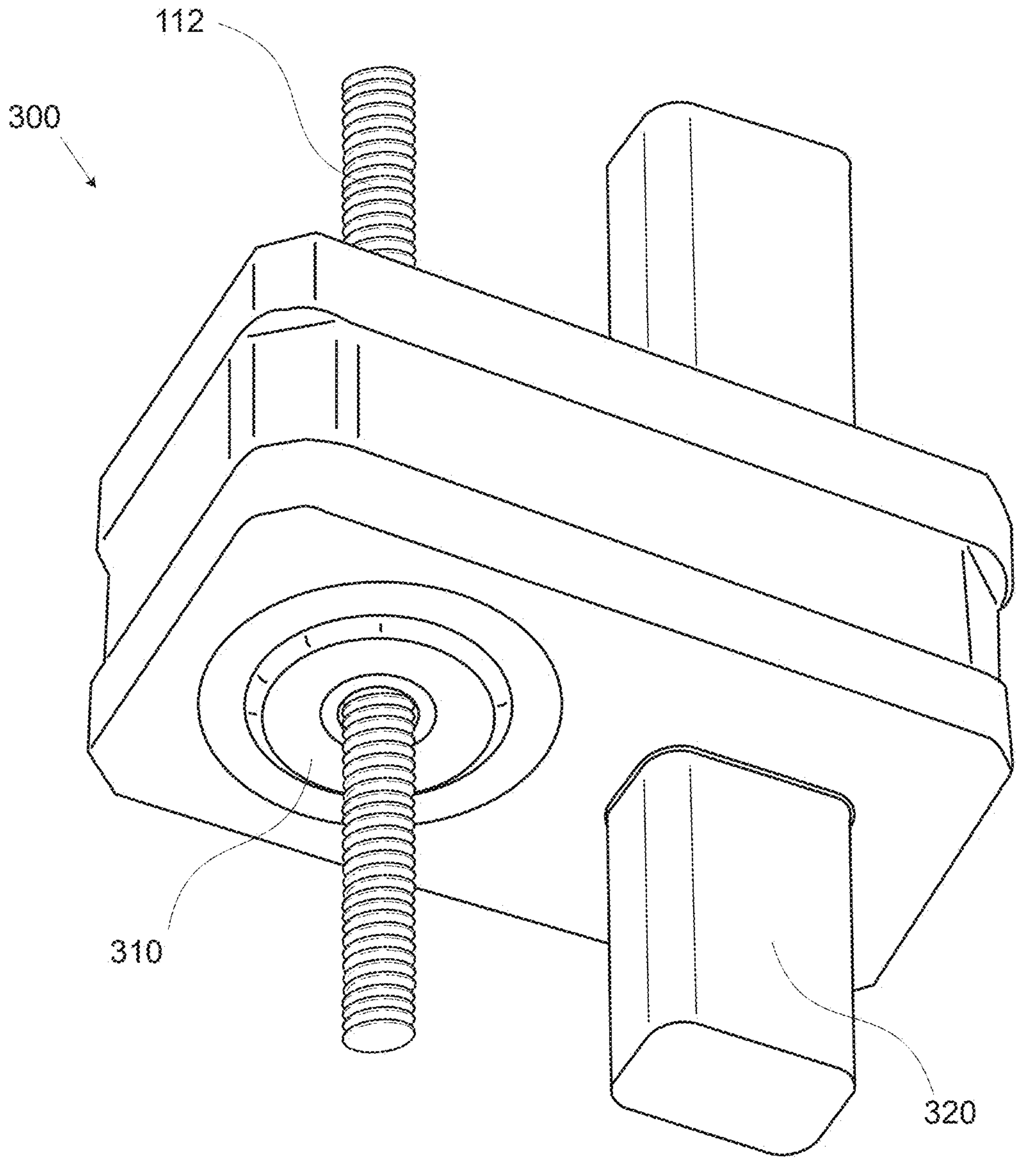
FIG. 3 is a detailed view of a screw drive mechanism of the electric jack, according to one or more embodiments.

Referring to FIG. 3, an internal screw drive mechanism 300 is shown according to one or more embodiments. The internal screw drive mechanism 300 of the tool body 110 converts a rotational motion of an electric motor 310 contained within the tool body 110 to linear displacement of the actuating platform 118. In the embodiment shown, the screw drive mechanism 300 may comprise a pass-through shaft lead screw stepper electric motor 310 axially aligned with the screw 112 and physically fixed to the tool body 110. The screw drive mechanism 300 may be rotatably fixed by a guide rod 320 which slidably engages the screw drive mechanism 300 and is fixed in parallel to the screw 112. As the electric motor 310 is engaged, the screw drive mechanism 300 slides along the screw 112 and is linearly displaced along the guide rod 320 such that the actuating platform 118 moves upwards or downwards depending on motor rotation direction. The guide rod 320 provides a great degree of rigidity to lifting and clamping operations and counters rotational torque created by the electric motor 310.

A regular screw 112 incorporates a large surface area of contact between the female-threaded portion of the internal nut of the electric motor 310 and the male-threaded portion of the screw 112, causing a considerable amount of friction between the screw 112 and the nut. Although this can cause frictional losses, it is favorable for the electric jack 100 to have a secure linkage that intrinsically resists forces acting on the electric jack 100 while lifting a workpiece. In another embodiment, the screw drive mechanism 300 may incorporate a ball screw and a braking mechanism. Since ball screws reduce frictional losses, they can create a potential hazard if power fails—as such a braking mechanism may provide a failsafe.

In this embodiment, the guide rod 320 may comprise a rectangular-type profile, but may instead take on other profiles, such as rail-type or channel-type profiles. The guide rod 320 may be a separate structure from the screw drive mechanism 300 and may be formed as an integral or separate part of the tool body 110 or be fixed thereto. The manifold **110*a*** is preferably formed from a polymer, composite, or aluminum alloy material selected for strength-to-weight ratio and resistance to deformation under operational load. In one embodiment, the system may include limit stops (not shown) or electronic sensors to prevent overextension or mechanical jamming of the platform at the travel extremes.

In some embodiments, the tool body 110 comprises a sealed housing formed from a polymer material to protect internal components from dust and moisture while enclosing the screw drive mechanism 300 and electric motor 310.

Figure 4:
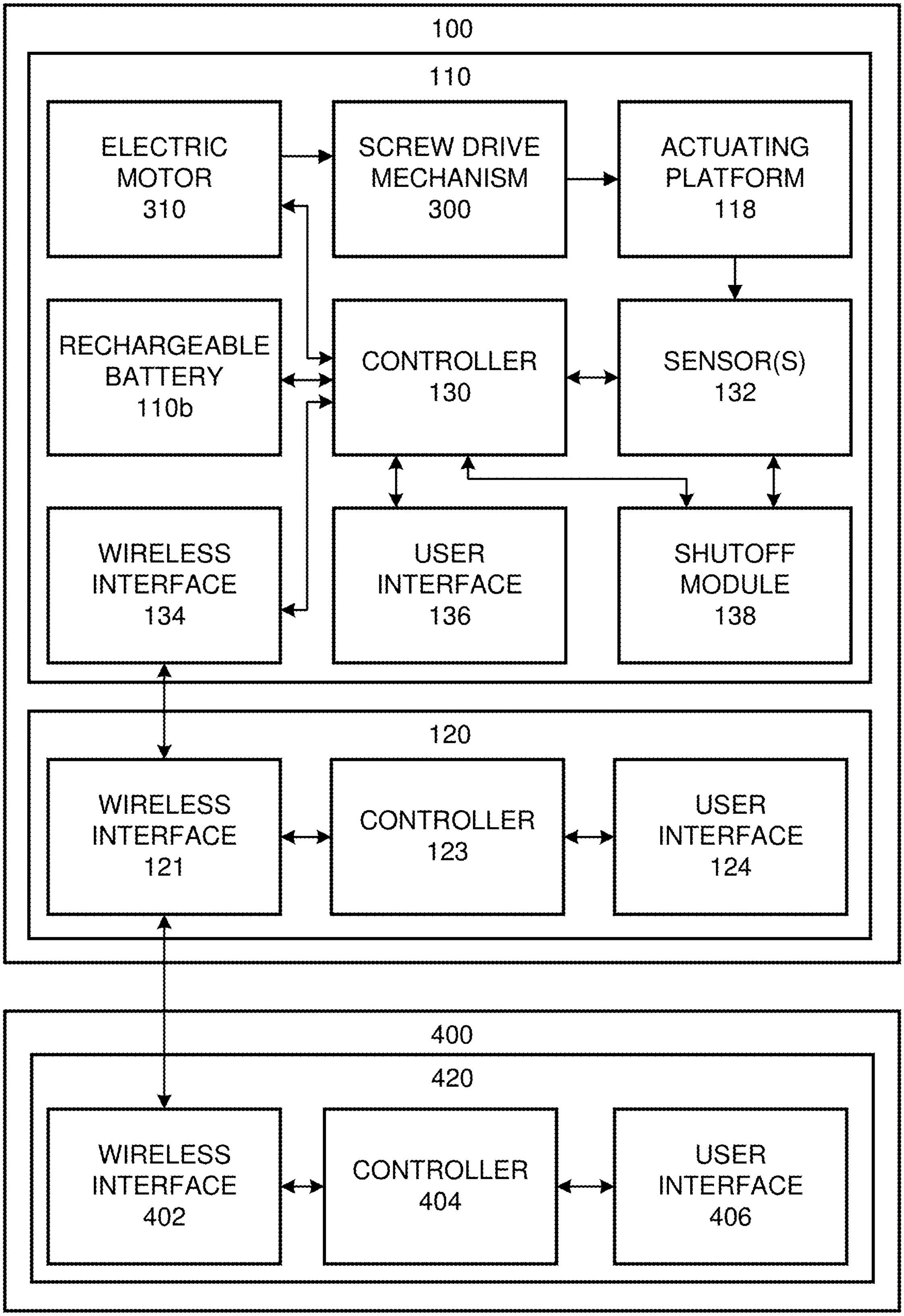
FIG. 4 is a functional block diagram showing electronic components of the electric jack, according to one or more embodiments.

Referring to FIG. 4, a functional block diagram shows the electric jack 100, including its control subsystems and interrelated hardware modules, according to one or more embodiments. The electric jack 100 comprises a tool body 110 and a detachable control module 120, each containing respective electronic components for coordinated operation.

The tool body 110 comprises a screw drive mechanism 300 comprising an electric motor 310, a screw drive mechanism 300, and an actuating platform 118, which are mechanically linked such that rotational motion from the electric motor 310 is converted into linear displacement of the actuating platform 118 through the screw drive mechanism 300. A detachable rechargeable battery **110*b* is electrically coupled to provide power to the electric motor 310 and to the remainder of the electronics housed within the tool body 110 as well as those of the control module 120 (including a rechargeable battery of the control module 120** not shown).

A controller 130 is disposed within the tool body 110 and is operatively coupled to the electric motor 310, detachable rechargeable battery **110*b*, and various user and sensor interfaces. In one or more embodiments, the controller 130 may comprise any data processing device, including but not limited to a microcontroller unit (MCU), system-on-chip (SoC), or embedded processor. The controller 130** typically includes a processor (a central processing unit (CPU), a graphic processing unit (GPU), a tensor processing unit (TPU), etc.), one or more memory devices, and a set of executable instructions (i.e., software and/or firmware) stored in the memory and configured to be executed by the processor.

Instructions stored in memory and configured to be executed by processors may include one or more software layers which interface directly or indirectly with the motor driver hardware. At a high level, these instructions may comprise application logic responsible for interpreting control signals received from the user interface 136 or wireless interface 134, validating them according to safety and operational constraints, and translating them into actuation commands. These actuation commands are then passed through a control abstraction layer (e.g., a hardware abstraction layer or middleware) which interprets directional movement instructions (e.g., "raise platform," "lower platform") as voltage and timing parameters for controlling the motor driver circuitry.

At lower levels of operation, the controller 130 may execute firmware routines and driver code that communicate with the motor controller circuitry via a physical layer bus (e.g., SPI, I2C, UART, or GPIO). These routines may conform to the data link layer, ensuring that control packets and pulse width modulation (PWM) signals are accurately transmitted with timing integrity. Below that, at the physical layer, binary signals representing motor enable/disable, direction, and speed (e.g., through duty cycle modulation) are issued to gate drivers or H-bridge circuits that interface directly with the electric motor 310.

In one embodiment, the executable instructions may comprise a state machine or control loop (e.g., PID control) that continuously monitors encoder feedback, stall signals, or current-sense inputs to adjust motor power in real time. In this manner, the controller 130 can dynamically modulate motor operation based on user inputs and sensor feedback, ensuring safe and precise actuation of the screw drive mechanism 300 and the actuating platform 118.

During Regular Operation, the Controller 130 is Configured to Perform the Following Functions:

a) Receive user control signals from the user interface 136 (when the control module 120 is docked), including commands to power on, power off, and initiate upward or downward movement of the actuating platform 118.
b) Determine whether control input conditions satisfy safety criteria (e.g., dual-button actuation of the trigger 122 and the user interface 124).
c) Activate or deactivate the electric motor 310 accordingly, controlling rotation direction and speed to drive the screw mechanism 300.
d) Monitor inputs from one or more sensors 132, including load data from a load sensor and state changes in an optional stall detection or torque feedback system.
e) Transmit or receive wireless communication signals via a wireless interface 134, which is configured for bidirectional communication with the control module 120.
f) Trigger an automatic shutoff module 138 in response to predefined timeout events, fault conditions, or anomalous sensor readings.

The Controller 130 May Execute Routines to:

a) Debounce or validate user control inputs.
b) Interlock controls to prevent operation if load thresholds are exceeded.
c) Implement emergency shutdown procedures upon stall detection, overheating, or low-voltage conditions.
d) Log operational state, including motor runtime, peak loads, and communication integrity for post-use diagnostics.
e) Prioritize command source (e.g., remote vs on-tool) based on physical state or signal integrity.

The controller 130 is further coupled to a user interface 136 and the shutoff module 138. The user interface 136 on the tool body 110 primarily comprises a power button to enable or disable the motor. Directional controls are not included in the tool body and are instead provided exclusively on the control module 120. This arrangement ensures that power activation and direction commands require deliberate input from both interfaces, supporting the dual-input safety interlock. The shutoff module 138 enforces timeout or fault-based shutdowns of the electric motor 310 or the entire system and may also disable the wireless transceiver 134 in the event of repeated unauthorized connection attempts.

The controller 130 may comprise a stall detection mechanism. The stall detection mechanism may be implemented by continuously monitoring one or more sensor inputs indicative of the electric motor's operational state. In one embodiment, the controller 130 monitors a motor current draw, where a sudden or sustained increase thereof beyond a predetermined threshold indicates a stall condition—i.e., the motor is being prevented from rotating by an obstruction or overload. Alternatively or additionally, the system may use feedback from a rotary encoder or a position sensor coupled to the motor or screw drive mechanism 300 to detect if commanded rotation fails to produce expected movement.

Upon detecting a stall condition, the controller 130 immediately disables power to the electric motor 310, activating an emergency stop to prevent damage to the tool or the workpiece. The system may also generate a fault signal or alert to inform the user via the user interface 136 or remote control module 120. Stall detection thresholds and response timing may be configurable to balance sensitivity and avoid false triggering during transient load fluctuations. The controller may require a manual reset before normal operation can resume, ensuring that the cause of the stall is addressed prior to further use.

The control module 120 comprises its own controller 123 and user interface 124, which includes directional control buttons or toggles (e.g., UP and DOWN) required for commanding the movement direction of the actuating platform 118. It also includes a power trigger 122 or button analogous to the power button on the tool body 110. These controls are necessary for remotely or directly operating the electric jack 100.

The wireless interface 121 and wireless interface 134 are configured for secure bidirectional communication. In one embodiment, these interfaces operate over a short-range RF protocol (e.g., 2.4 GHz), but alternative wireless technologies such as Bluetooth® Low Energy, Zigbee, or a proprietary link-layer protocol may be employed. The controllers 123 and 130 may implement encryption, authentication handshakes, or rolling code schemes to ensure that only paired devices can operate together.

During Detached Operation, Controller 123 Executes Instructions to:

a) Interpret user inputs from the user interface 124 and encode them into control packets.
b) Transmit control packets via the wireless interface 121 to the tool body 110.
c) Process acknowledgment or fault signals returned by the controller 130.
d) Enforce local safety interlocks, such as simultaneous dual-button actuation or delay-based verification prior to transmission.
e) Display operational state, battery level, or signal quality (if present in the embodiment).

In some embodiments, the control module 120 may include internal storage for firmware updates or parameter storage (e.g., timeout intervals, weight limits), and may be connected to an external interface for device management (e.g., USB-C port or NFC interface).

The wireless interface 134 and/or the wireless interface 121 may also be communicatively coupled to a wireless interface 402 of a similar, analogous electric jack 400 comprising a controller 404 and a user interface 406. Wireless interface connectivity enables bidirectional communication between the electric jack 100 and the other electric jack 400 and allows certain synchronization features which may provide finer lifting control of an irregular workpiece and more details of physical properties.

The systems and components described throughout the foregoing specification may be operated according to various methods of use. The following examples provide exemplary, non-limiting procedures for operating the electric jack under different conditions, including wireless remote control, safety-interlocked activation, and coordinated multi-jack lifting. These methods illustrate the interaction of hardware and software components disclosed herein and may be implemented using the control logic described in conjunction with FIG. 4, stored executable instructions, and additional hardware modules such as load sensors, wireless interfaces, and user interfaces. Each method is broken down into functional steps, which may also be illustrated using flowcharts in corresponding drawing figures (e.g., FIGS. 5-7).

In one embodiment, the electric jack may be configured to be operated remotely via a detachable control module that transmits control signals wirelessly to the electric jack tool body.

Figure 5:
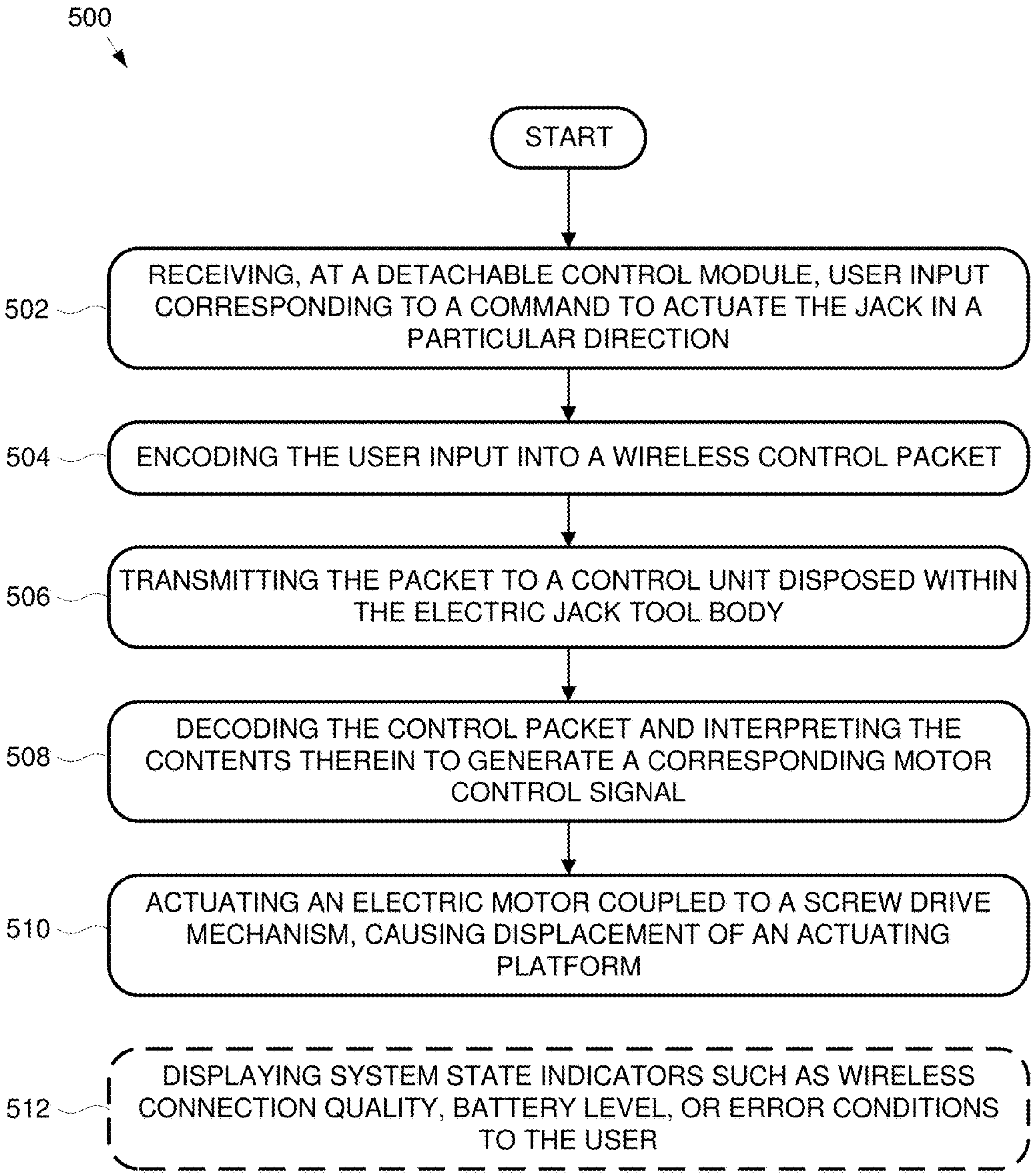
FIG. 5 is a flowchart showing a method of wirelessly operating the electric jack through a detachable control module, according to one or more embodiments.

Referring to FIG. 5, a remote wireless operation method 500 of an electric jack is shown. In a step 502, a user input is received at a detachable control module, the input corresponding to a command to actuate the jack in a particular direction (e.g., lift or lower). In a step 504, the control module encodes the user input into a wireless control packet. In a step 506, the control module transmits the packet to a control unit disposed within the electric jack body. In a step 508, the control unit decodes the control packet and interprets its contents to generate a motor control signal. In a step 510, the motor control signal is used to actuate an electric motor coupled to a screw drive mechanism, causing displacement of an actuating platform. In a step 512, the control module optionally displays system state indicators such as wireless connection quality, battery level, or error conditions to the user.

In another embodiment, the electric jack may incorporate a method 600 to ensure the electric jack only activates when deliberate, valid control inputs are received, and additional safety conditions are met.

Figure 6:
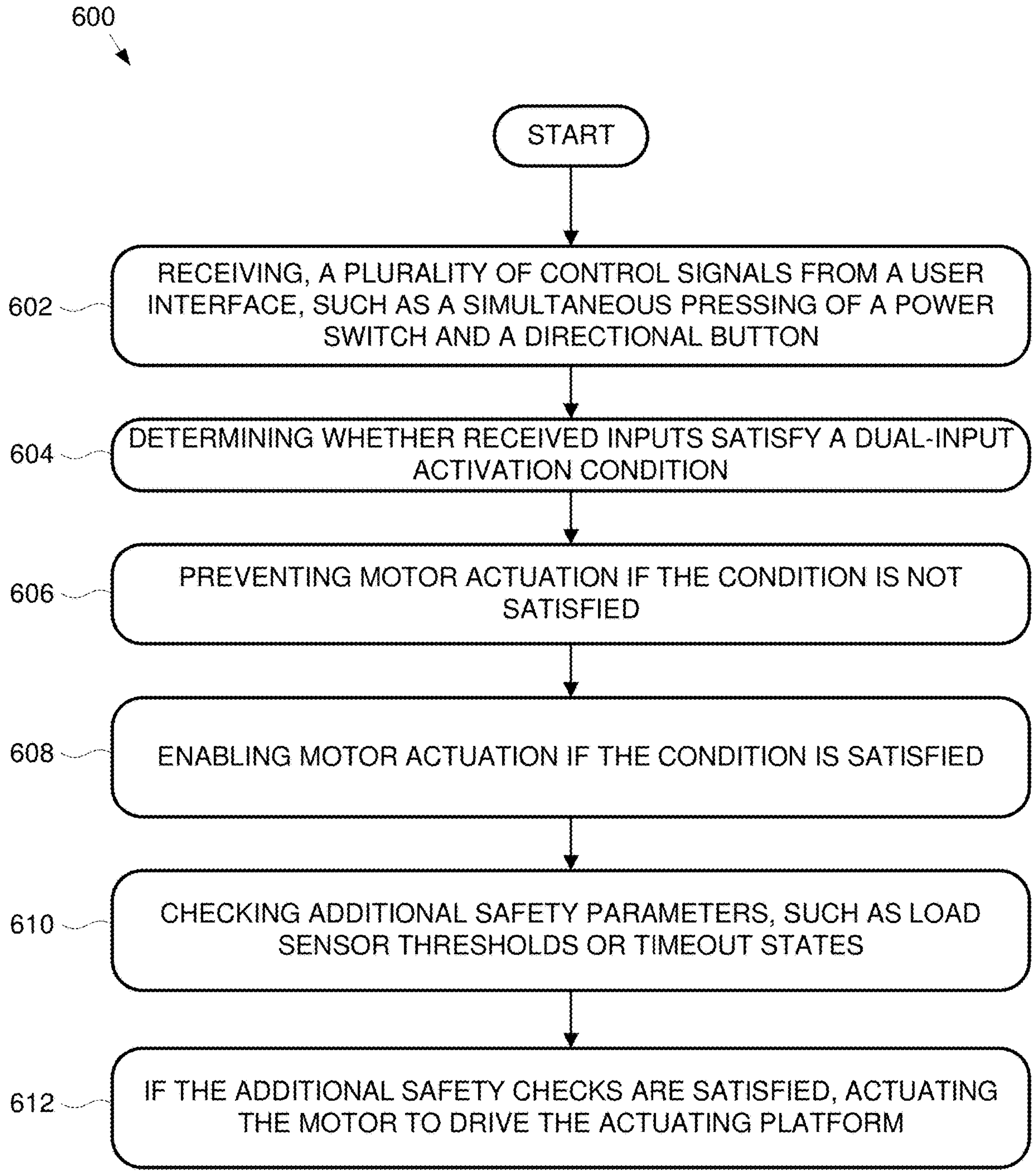
FIG. 6 is a flowchart showing a secure method of activating the electric jack, according to one or more embodiments.

Referring to FIG. 6, a secure method of activating the electric jack is shown. In a step 602, a plurality of control signals are received from a user interface, such as simultaneous pressing of a power switch and a directional button. In a step 604, the system determines whether the received inputs satisfy a dual-input activation condition. In a step 606, if the condition is not satisfied, the system prevents motor actuation. If the condition is satisfied, in a step 608, a motor control routine is enabled. In a step 610, the system checks additional safety parameters, such as load sensor thresholds or timeout states. In a step 612, if the additional safety checks are satisfied, the motor is actuated to drive the actuating platform; otherwise, the system either halts or reverts to standby.

In yet another embodiment, the electric jack may be configured to coordinate operations with one or more additional electric jacks, enabling balancing lifting loads and stopping collectively when a fault or imbalance is detected.

Figure 7:
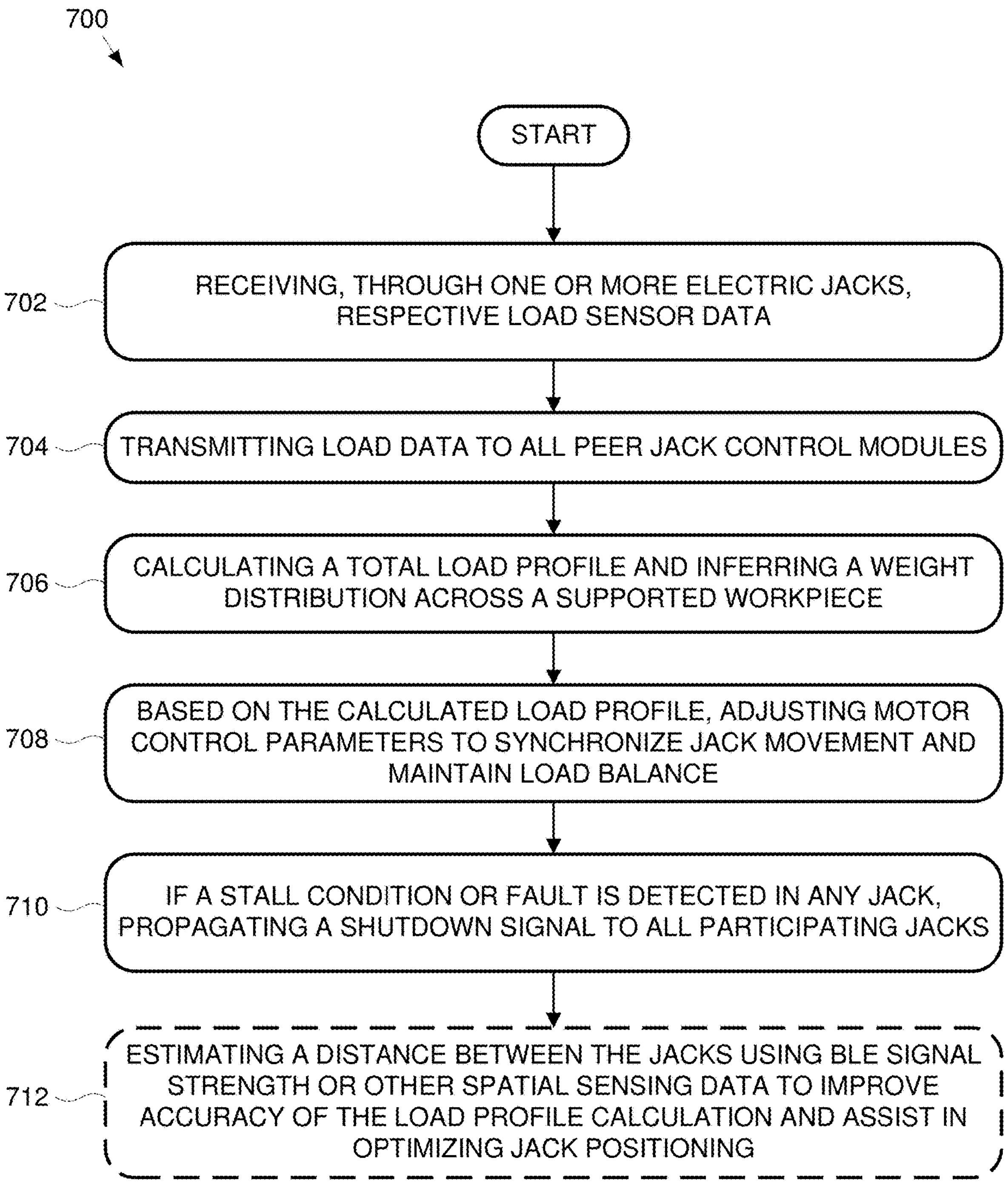
FIG. 7 is a flowchart showing a coordinated method for multi-jack operation, according to one or more embodiments.

Referring to FIG. 7, a method 700 for coordinated multi-jack operation is shown. In a step 702, a plurality of electric jacks each measure their respective load using internal load sensors. In a step 704, each jack transmits its load data to peer jack control modules over a wireless protocol such as BLE or Zigbee. In a step 706, one or more jacks calculate a total load profile and infer a weight distribution across the supported workpiece. In a step 708, using the calculated profile, the system adjusts motor control parameters (e.g., speed, timing, direction) to synchronize jack movement and maintain load balance. In a step 710, if a stall condition or fault is detected in any one jack, the system propagates a shutdown signal to all participating jacks to prevent tipping or load shifting. In a step 712, optional distance estimation between jacks is performed using BLE signal strength or other spatial sensing data to improve accuracy of the weight distribution analysis and assist in optimizing jack positioning.

What is claimed is:

1. An electric jack comprising:

a tool body comprising:

an electric motor;

a screw drive mechanism operatively coupled to the electric motor;

an actuating platform configured to be moved linearly by the screw drive mechanism;

a rechargeable battery;

a wireless communication interface;

a control module comprising a housing, a controller, directional controls, a power control interface, a transceiver, and a docking interface configured to releasably couple to the tool body, wherein the control module is communicatively coupled to the electric motor through the wireless communication interface, wherein when coupled to the tool body, the control module physically serves as a handle for one-handed operation of the electric jack, wherein the tool body comprises a power control interface for use when the control module is coupled, wherein the tool body does not include directional controls, wherein the controller comprises a processor and a memory, wherein the controller is configured to execute instructions stored in the memory through the processor, said instructions operate the electric motor when detecting manipulation of both the directional controls and at least one of: the power control interface of the tool body and the power control interface of the control module, and wherein the control module provides remote operation of the electric jack when decoupled from the tool body.

2. The electric jack of claim 1, wherein the control module comprises manually-operable controls for remotely manipulating the actuating platform.

3. The electric jack of claim 1, further comprising a dual-input control mechanism requiring at least two distinct inputs to be received in order to activate manipulation of the actuating platform, wherein the dual-input control mechanism is disposed on at least one of the tool body and the control module.

4. The electric jack of claim 1, wherein the screw drive mechanism comprises a lead screw.

5. The electric jack of claim 1, comprising a sealed housing enclosing at least the screw drive mechanism and the electric motor, said sealed housing constructed from a polymer material.

6. The electric jack of claim 1, wherein the screw drive mechanism comprises a lead screw operatively engaged with a guide structure integrated into an interior surface of the tool body.

7. The electric jack of claim 6, wherein the guide structure is vertically aligned with the lead screw within a housing of the tool body.

8. The electric jack of claim 1, further comprising a load detection mechanism configured to monitor one or more forces on the actuating platform.

9. The electric jack of claim 8, wherein the load detection mechanism is configured to prevent operation if a predetermined load threshold is exceeded.

10. The electric jack of claim 8, wherein the load detection mechanism utilizes a strain gauge sensor.

11. The electric jack of claim 1, further comprising a stall detection mechanism configured to detect a stall condition of the electric motor and activate an emergency stop function.

12. The electric jack of claim 1, further comprising a manual override mechanism configured to enable manual adjustment of the actuating platform.

13. The electric jack of claim 1, wherein the screw drive mechanism comprises a lead screw operatively coupled to a guide structure integrated within the tool body to enable conversion of rotational motion of the electric motor into linear motion of the actuating platform.

14. The electric jack of claim 1, wherein the wireless communication interface is configured to pair with one or more additional electric jacks to enable synchronized operation.

15. The electric jack of claim 14, further comprising a load sensor and a weight distribution analysis module configured to assess lifting loads from the one or more additional electric jacks.

* * * * *